United States Patent [19]

Urquhart

[11] 4,263,877

[45] Apr. 28, 1981

[54] FLUIDIZED BED COMBUSTION

[75] Inventor: William M. Urquhart, Renfrew, Scotland

[73] Assignee: Babcock & Wilcox, Inc., London, England

[21] Appl. No.: 973,160

[22] Filed: Dec. 26, 1978

[51] Int. Cl.³ .............................................. F22B 1/02
[52] U.S. Cl. .................................. 122/4 D; 110/245; 110/263; 431/170
[58] Field of Search ............... 122/4 D; 110/245, 263; 431/170, 7

[56] References Cited

U.S. PATENT DOCUMENTS

| | | | |
|---|---|---|---|
| 3,645,237 | 2/1972 | Seth | 110/245 X |
| 3,763,830 | 10/1973 | Erlich et al. | 122/4 D |
| 4,009,121 | 2/1977 | Luckenbach | 122/4 D X |
| 4,062,656 | 12/1977 | Blaser | 110/245 X |
| 4,148,437 | 10/1979 | Barker et al. | 431/170 X |
| 4,171,945 | 10/1979 | Lazehby | 110/245 X |

Primary Examiner—Edward G. Favors
Attorney, Agent, or Firm—Kemon & Estabrook

[57] ABSTRACT

This invention relates to fluidized bed combustors and provides for the operation of such combustors so that the bed forms an upper fluidized layer and a lower, more static, layer into which larger particles may fall to be drained away.

5 Claims, 8 Drawing Figures

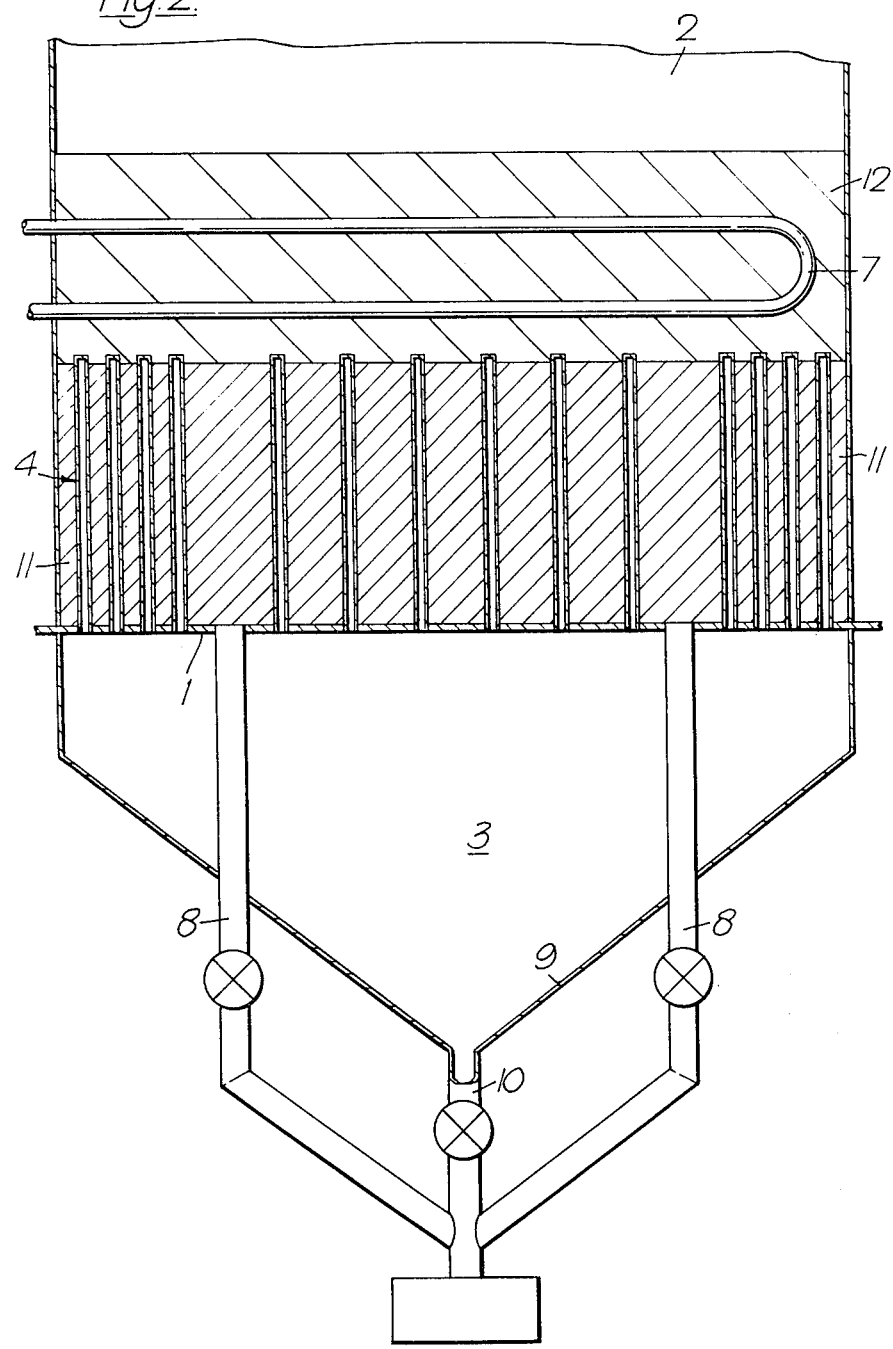

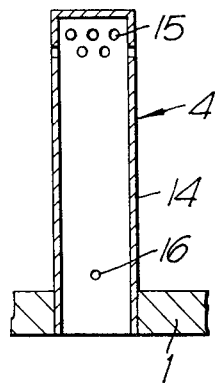
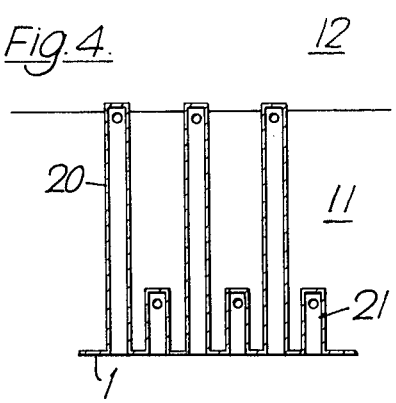
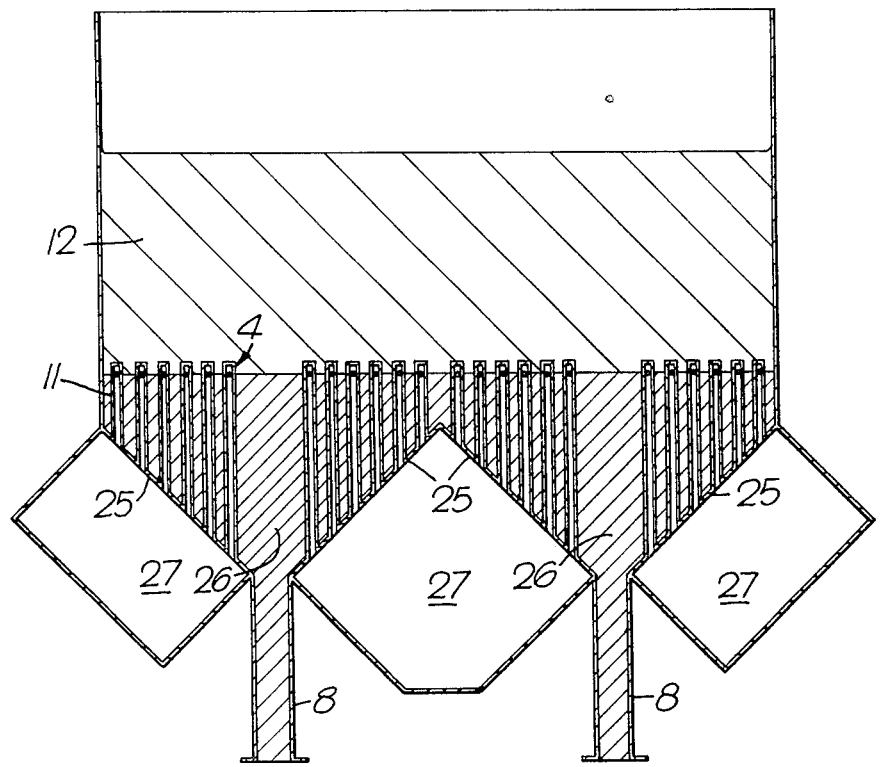

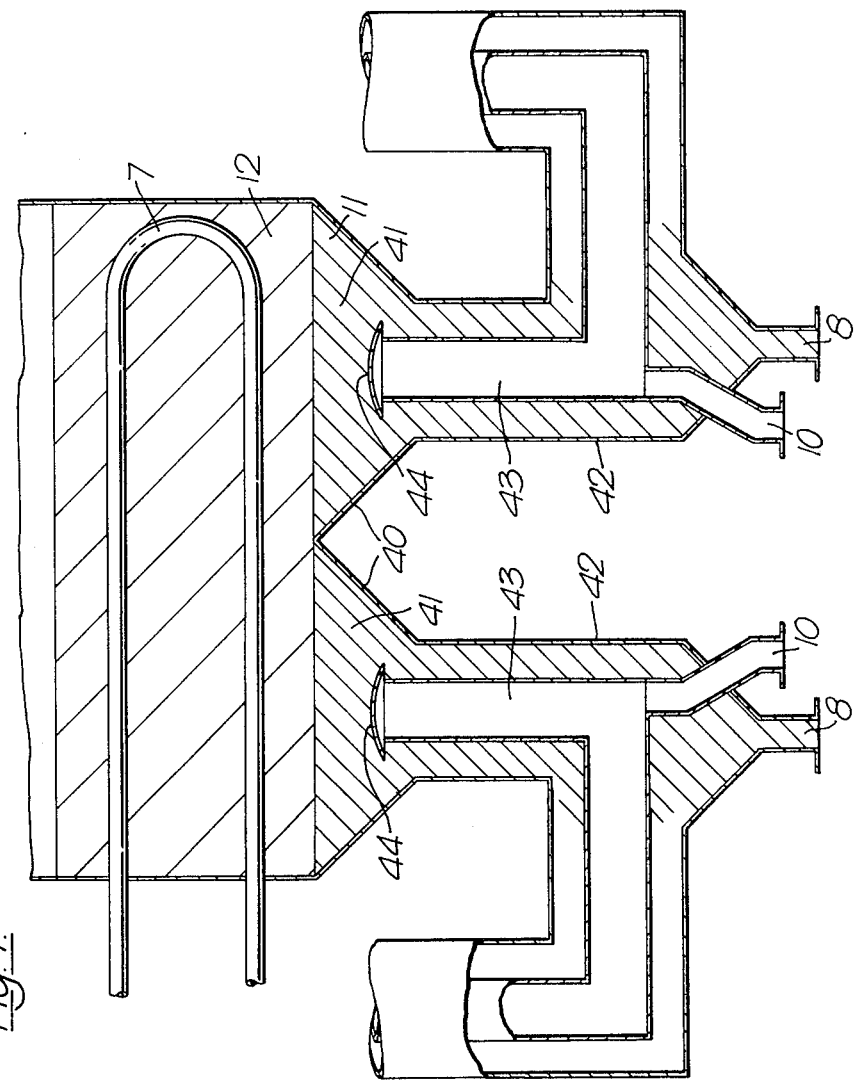

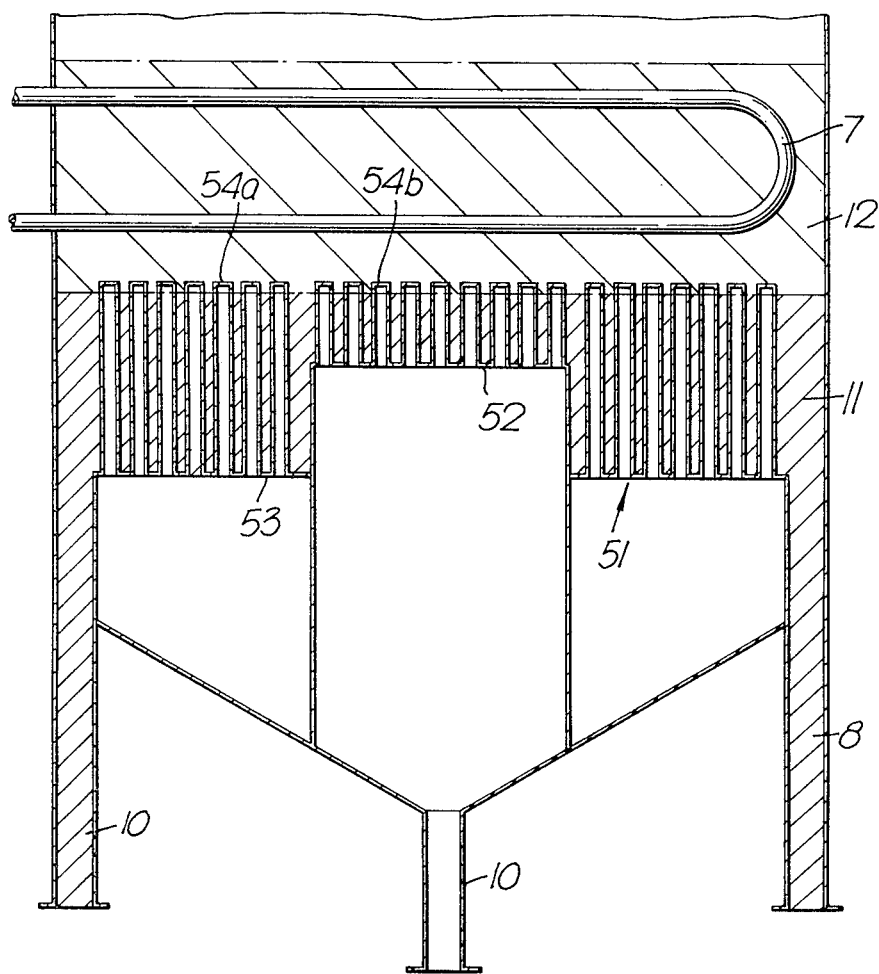

FLUIDIZED BED COMBUSTION

DESCRIPTION

This invention relates to fluidised bed combustors and provides a method of operating a fluidised bed combustor in a way that may enable some of the ancillary equipment previously considered concomitant to the satisfactory operation of fluidised bed combustors to be dispensed with.

According to the present invention, there is provided a fluidised bed combustor operating with a fluidised combustion layer overlying a lower, static, layer into which material from the fluidised combustion layer may fall, and means through which material from the lower layer drains from the combustor.

According to the present invention, there is also provided a fluidised bed combustor operating with a fluidised layer overlying a lower, static, layer containing material of dimensions greater than those that are maintained in the fluidised condition in the fluidised layer and into which material from the fluidised layer may fall, and means through which material from the lower layer drains from the combustor.

By way of example, embodiments of the invention will now be described with reference to the accompanying, somewhat schematic, drawings, in which:

FIG. 2 is a detail of FIG. 1, showing the fluidised bed supported on a floor that is in the form of a flat and horizontal distributor plate from which air discharge nozzles extend upwardly;

FIG. 3 illustrates a nozzle included in the apparatus illustrated in FIGS. 1 and 2;

FIG. 4 illustrates a modification of the nozzle arrangement illustrated in FIG. 3;

FIG. 5 illustrates a modification of what is shown in FIGS. 1 and 2 in which the distributor plate, in effect, forms a number of hoppers;

FIG. 7 illustrates a modification of what is shown in FIG. 1 in which the continuous distributor plate is disposed with; and FIG. 8 illustrates another modification in which the velocities at which air is discharged at different zones of the bed are different.

Figure 1:
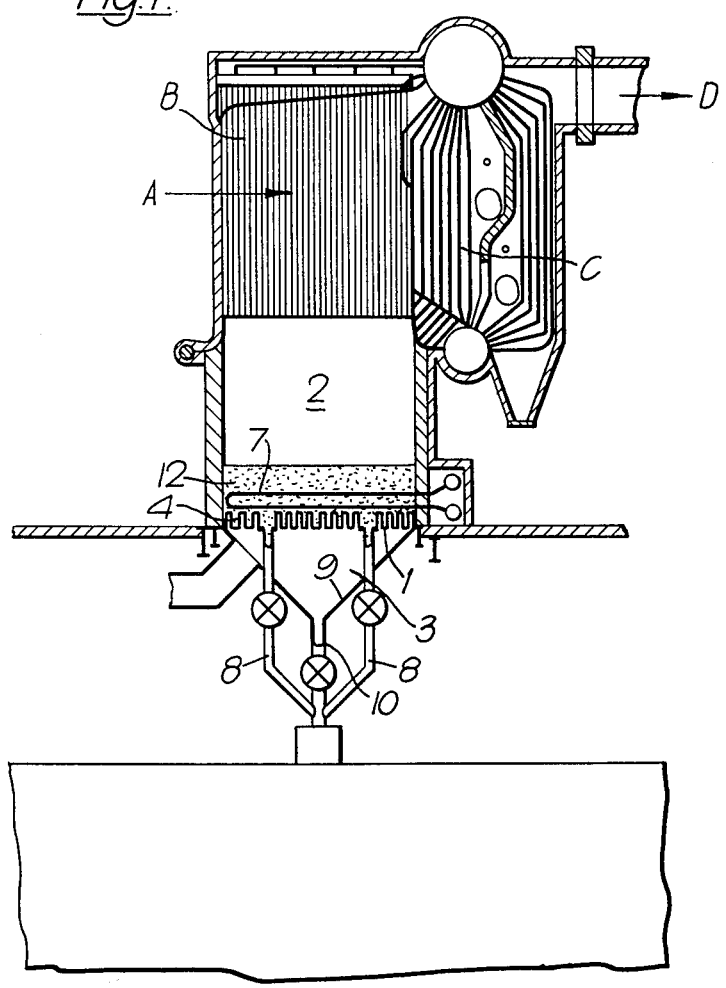
FIG. 1 illustrates fluidised bed combustion apparatus.

The fluidised bed combustion apparatus shown in FIG. 1 includes a chamber 2 arranged for over head firing. Hot gases rising from the bed pass through a passage A defined by vertical fluid heating tubes B, and then laterally across the fluid heating tubes C to a boiler gas take-off D. In the tube-off, the exhaust gases may heat means (not shown) in which air that is subsequently supplied to the fluidised bed is heated.

The floor of the chamber 2 is formed by a flat, horizontal, distributor plate 1. The distributor plate 1 also forms the upper boundary of a wind box, or air chamber 3 and parallel nozzles 4, of uniform height, extend upwardly from the distributor plate 1. Above the nozzles 4, there extend cooling tubes 7 through which a fluid can be passed to extract heat from the fluidised bed.

From locations spaced about the distributor plate 1, there are ash pipes 8 through which material from the bed can be drained off. The bottom 9 of the wind box 3 is in the form of a hopper and an ash pipe 10 leads from the lowest point of the bottom 9. The ash pipes 8 and 10 discharge through an ash feeder. Each ash pipe is valve controlled and means (not shown) may be provided for opening the ash pipes in any desired sequence.

In operation of the apparatus shown in FIGS. 1 and 2 solid fuel is fed to the bed from above and the bed may contain pieces of a size larger than would normally be considered acceptable having regard to the fact that combustion itself may not be effective to prevent the formation of large ash particles and such particles may not either be reduced in size by erosion. Such larger particles will, in operation, settle into a lower comparatively static, layer 11 resting on the distributor plate 1 whilst the lighter part of the material in the bed will form a fluidised combustion layer 12 above it. Material is drained through the ash pipes 8 at such a rate as to ensure that the upper level of the lower layer lies a little above the air nozzles 4. In this way it can be ensured that tubes 7 lie continuously wholly within the fluidised layer 12 with better heat exchange than might be expected if the tubes were in contact with the heavier, more static, material.

Since the apparatus can operate with the supply to the bed of particles of a size that it would previously have been preferred to avoid, the expense of equipment previously provided to eliminate them can be avoided. In particular, it is possible to use unwashed coal that has not been treated to prevent the admission to the bed of large particles, so that the costs, both in the capital cost of ancillary equipment and the cost of running the equipment can be reduced.

FIG. 3 shows one of the air nozzles 4. The nozzle 4 is in the form of a tube 14 closed at its upper end except for circumferentially distributed holes 15 through which major part of the air used in fluidising, and supporting combustion in, the upper layer 11 is supplied. At the lower end of the nozzle 4, just above the distributor plate 1, are further holes 16 through which air escapes at a velocity lower than that escaping through the holes 15 and serving mainly to cool the ash in the lower layer 10 with the result that the problems of handling the ash are reduced. At the same time, a degree of pre-heating is imparted to the combustion air, and this tends to greater efficiency. It will be seen that the locations from which air is discharged to the fluidised bed are all higher than the inlets to the ash pipes from which ash drains from the fluidised bed.

As is illustrated in FIG. 4, an effect comparable to that obtained by the nozzles shown in FIG. 3 can be obtained by using nozzles 20 and 21 which each has an opening only at its upper end, but the nozzles 20 being longer than the nozzles 21. The upper ends of the former lie just below the fluidised layer 12 whilst the upper ends of the latter lie just above the distributor plate 1.

In the modification shown in FIG. 5, the floor 25 of the fluidised bed is in the form of a number of hoppers 26 such that material in the lower layer 11 must tend to drain towards the bottom of one or other of the hoppers 26. There is an ash pipe 8 leading from the lower end of each of the hoppers 26. Air is supplied from a number of wind boxes 27. The wind boxes may be connected together so that air is supplied at the same velocity to all the nozzles 4. Alternatively, each wind box 27 may be separately controlled so that the air supply across the fluidised bed can be varied.

Figure 6:
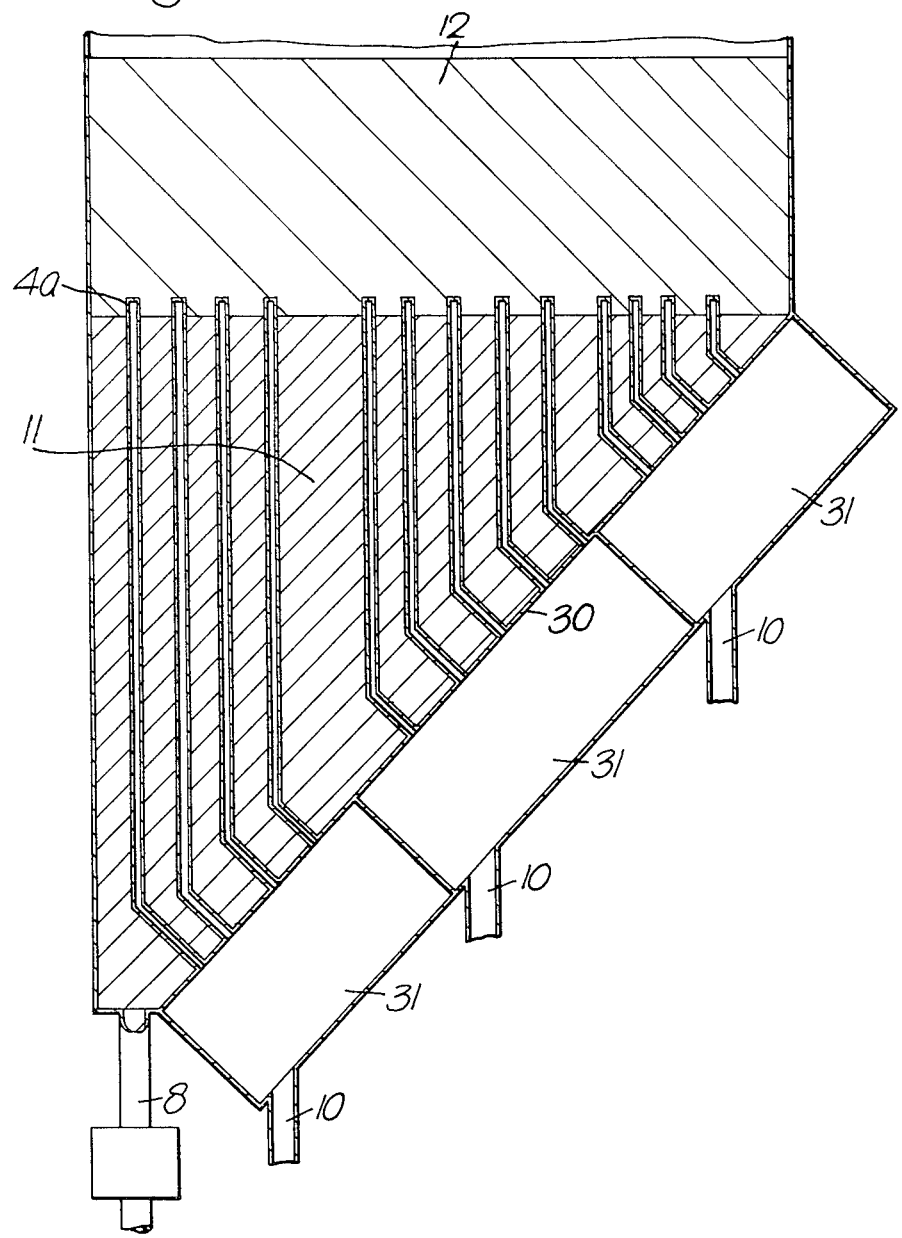
FIG. 6 illustrates a modification of what is shown in FIG. 1 in which the distributor plate is flat but inclined.

The embodiment illustrated in FIG. 6 differs from that in FIG. 2 essentially in that the flat bottom, formed by the distributor plate 30, slopes continuously so that the withdrawal of ash is effected solely from the lower end of the distributor plate 30. With this arrangement, the link of the nozzles 4a increase progressively across the width of the bed; they are shown to be supplied from a series of wind boxes 31 but these could be replaced by a single wind box, as is shown in FIG. 2.

In the modification illustrated in FIG. 7, the floor 30 of the chamber is in the shape of a series of hoppers 41 and there are no air nozzles projecting upwardly from a distributor plate. Each hopper 41 opens into a duct 42 through which ash is conveyed away, and the air that passes through the fluidised bed is introduced through ducts 43, each concentric within one of the ducts 42. The upper end of each duct 43 is domed, at 44, leaving a gap between the dome 44 and the upper end of the duct 43 through which air can diffuse into the static layer 11 through a more-or-less continuous circle. The method illustrated by FIG. 7 is likely to be of a special value in the firing of heavy coal particles, or when limestone containing heavy particles is delivered to form a substantial part of the fluidised bed.

FIG. 8 illustrates a modification that also uses an invention that is separately claimed in our co-pending application of even date. In that invention, the velocity at which fluidising air is supplied to one part of the bed is different from that which air is supplied to an adjacent part of the bed, with the result that material from the part of the bed to which air is supplied at one velocity will tend to move towards the part to which material is supplied at the other velocity.

In the particular embodiment illustrated in FIG. 8, the floor is in the form of a distributor plate 51 having parts 52 at a level higher than that of other parts 53. The upper ends of the nozzles 54 from all parts of the distributor plate 51 are at the same level, having their outlets just below the top of the lower, static, layer 11. The air supplied to the shorter nozzles 54b is at a lower velocity than that of the air supplied to the longer nozzles 54a. Moreover, there are outlets only at the upper ends of the shorter nozzles whilst the longer nozzles are also provided with outlets, as are shown in FIG. 3, just above the distributor plate 51. A result of the velocity difference is that mixing between different parts of the upper layer 12 is promoted so that a smaller proportion of grits that contain carbon are carried out of the bed to the boiler. At the same time, it is possible to refire grits that have been carried to the outlet of the boiler to the area of lower fluidising velocity, which results in a longer residence time and, therefore, a greater retention and combustion grit in the bed. This results in increased combustion efficiency of small particles in both coal fines and refired grits.

It will be seen that in all the embodiments that have been described, the locations at which the, or the major part, of the fluidising air is supplied lie above the level at which ash is removed from the fluidised bed.

I claim:

1. A fluidized bed combustor having a floor on which the fluidized bed is supported, drain means through which material from the bed can escape, a bank of tubes through which fluid to be heated is passed, and nozzles estending upwardly from the floor, the combustor operating with a fluidized combustion layer in which the bank of tubes lies overlying a lower, static, layer into which material from the fluidized combustion layer may fall and from which material escapes through the drain means, and combustion air being supplied through the nozzles to discharge into the lower layer nearer to the top than the bottom of the lower layer and also to discharge into the lower layer at a level below that.

2. A fluidized bed combustor as claimed in claim 1 in which each nozzle is such that combustion air discharges into the lower layer nearer to the top than the bottom of the lower layer through the upper end of the nozzle and also discharges from the nozzle into the lower lay at a level below that.

3. A fluidized bed combustor as claimed in claim 1 in which combustion air discharges from the upper ends of some of the nozzles into the lower layer nearer to the top then the bottom of the lower layer and from the upper ends of other of the nozzles into the lower layer at a level below that.

4. A fluidized bed combustor as claimed in claim 1 in which the drain means provides one or more outlets and each part of the floor slopes towards at least one of said outlets.

5. A fluidized bed combustor as claimed in claim 1 in which the drain means comprises a plurality of outlets and means is provided for controlling the outlets so that they are opened and closed sequentially.

* * * * *